US011154806B2

(12) United States Patent
Dahlgren et al.

(10) Patent No.: US 11,154,806 B2
(45) Date of Patent: Oct. 26, 2021

(54) METHOD FOR CONTROLLING FILTERING EFFICIENCY OF A FILTER FOR AN EXHAUST AFTERTREATMENT SYSTEM

(71) Applicant: Volvo Car Corporation, Gothenburg (SE)

(72) Inventors: Jan Dahlgren, Torslanda (SE); Stefan Dunert, Saro (SE)

(73) Assignee: Volvo Car Corporation, Gothenburg (SE)

( * ) Notice: Subject to any disclaimer, the term of this patent is extended or adjusted under 35 U.S.C. 154(b) by 307 days.

(21) Appl. No.: 16/407,237

(22) Filed: May 9, 2019

(65) Prior Publication Data

US 2019/0366256 A1   Dec. 5, 2019

(30) Foreign Application Priority Data

Jun. 4, 2018 (EP) .................................... 18175759

(51) Int. Cl.
| | | |
|---|---|---|
| *F02D 41/40* | (2006.01) | |
| *B01D 46/44* | (2006.01) | |
| *B01D 46/00* | (2006.01) | |
| *F01N 3/023* | (2006.01) | |
| *F01N 9/00* | (2006.01) | |
| *F01N 11/00* | (2006.01) | |
| *F02D 41/02* | (2006.01) | |

(52) U.S. Cl.
CPC ....... *B01D 46/446* (2013.01); *B01D 46/0063* (2013.01); *B01D 46/448* (2013.01);
(Continued)

(58) Field of Classification Search
CPC .............. B01D 46/446; B01D 46/0063; B01D 46/448; B01D 2279/30; F01N 3/023;
(Continued)

(56) References Cited

U.S. PATENT DOCUMENTS

| | | | | |
|---|---|---|---|---|
| 2009/0044514 | A1* | 2/2009 | Brahma | F01N 9/005 60/274 |
| 2010/0242449 | A1* | 9/2010 | Paterson | F01N 9/002 60/286 |

(Continued)

FOREIGN PATENT DOCUMENTS

| | | |
|---|---|---|
| CN | 1757886 A | 4/2006 |
| CN | 103122784 A | 5/2013 |

(Continued)

OTHER PUBLICATIONS

Office action and search report issued in the corresponding CN application No. 201910450515.4.

(Continued)

*Primary Examiner* — Matthew T Largi
(74) *Attorney, Agent, or Firm* — Clements Bernard Walker; Christopher L. Bernard

(57) ABSTRACT

A method for controlling a filtering efficiency of a filter including a filtering area between an inflow area and an outflow area. Determining a present exhaust mass flow into the filter. Determining a pressure drop across the filter from the inflow area and the outflow area of the filter. Normalizing the measured pressure drop to provide a normalized pressure drop according to a predetermined normalization pressure level at a predetermined temperature for a model filter. Comparing the normalized pressure drop to a pressure drop model including a relation between the pressure drop across a filter and exhaust mass flow to the filter. Determining a pressure deviation between the normalized pressure drop and a pressure drop value calculated based on the pressure drop model and the present exhaust gas flow. Controlling the pressure drop across the filter for reducing the pressure deviation.

15 Claims, 3 Drawing Sheets

(52) U.S. Cl.
CPC ............ *F01N 3/023* (2013.01); *F01N 9/002* (2013.01); *F01N 11/002* (2013.01); *F02D 41/024* (2013.01); *F02D 41/029* (2013.01); *F02D 41/401* (2013.01); *B01D 2279/30* (2013.01); *F01N 2430/06* (2013.01); *F01N 2430/08* (2013.01); *F01N 2560/06* (2013.01); *F01N 2560/08* (2013.01); *F02D 2200/0802* (2013.01); *F02D 2200/0812* (2013.01)

(58) Field of Classification Search
CPC .... F01N 9/002; F01N 11/002; F01N 2430/06; F01N 2430/08; F01N 2560/06; F01N 2560/08; F01N 2550/04; F01N 2900/0412; F01N 2900/1406; F01N 2900/1606; F01N 9/005; F02D 41/024; F02D 41/029; F02D 41/401; F02D 2200/0802; F02D 2200/0812; F02D 41/1448; F02D 41/1446
See application file for complete search history.

(56) References Cited

U.S. PATENT DOCUMENTS

| | | | | |
|---|---|---|---|---|
| 2013/0125529 A1* | 5/2013 | Ardanese | ................ | F01N 9/007 60/274 |
| 2013/0199159 A1* | 8/2013 | Swoish | ............... | F02D 41/1448 60/274 |
| 2014/0033680 A1 | 2/2014 | Swoish et al. | | |
| 2015/0020504 A1* | 1/2015 | Nicole | ................ | F01N 13/008 60/274 |
| 2015/0068192 A1 | 3/2015 | Swoish et al. | | |
| 2016/0146135 A1* | 5/2016 | Goodall | .............. | F02D 41/1446 701/103 |
| 2016/0186636 A1* | 6/2016 | Odendall | .............. | F01N 11/002 60/273 |
| 2017/0182447 A1* | 6/2017 | Sappok | ............. | B01D 46/0086 |

FOREIGN PATENT DOCUMENTS

| | | |
|---|---|---|
| CN | 204783184 U | 11/2015 |
| EP | 3040531 A1 | 7/2016 |
| GB | 2504714 A | 2/2014 |
| JP | 2002256846 A | 9/2002 |
| WO | 20120030278 A1 | 3/2012 |

OTHER PUBLICATIONS

Aug. 8, 2018 European Search Report issue on International Application No. EP18175759.2.

\* cited by examiner

METHOD FOR CONTROLLING FILTERING EFFICIENCY OF A FILTER FOR AN EXHAUST AFTERTREATMENT SYSTEM

CROSS-REFERENCE TO RELATED APPLICATION

The present disclosure claims the benefit of priority of co-pending European Patent Application No. 18175759.2, filed on Jun. 4, 2018, and entitled "A METHOD FOR CONTROLLING FILTERING EFFICIENCY OF A FILTER FOR AN EXHASUT AFTERTREATMENT SYSTEM," the contents of which are incorporated in full by reference herein for all purposes.

TECHNICAL FIELD

The present invention relates to a method for controlling a filtering efficiency of a filter for an exhaust aftertreatment system. The present invention also relates to an exhaust aftertreatment system.

BACKGROUND

With increasing emissions requirements for particulates in the emission from vehicles and other combustion sources particulate filters has been introduced. Particulate filter are designed to remove particulates (so called soot) from the exhaust gas before the exhaust gas is emitted into the environment. The particulates are stored in the filter.

When the particulate level increases in the filter the backpressure across the filter also increases. An excessive backpressure leads to exhaust passage blocking and ultimately to engine malfunction. The filter may of course be replaced when the particulate level in the filter reaches a predetermined level.

However, most modern filters are adapted to be regenerated or cleaned by controlling the combustion process. For instance, increasing the temperature of the exhaust gas or injecting fuel into the exhaust gas enables combustion of the particulates in the filter.

By cyclically combusting the particulates in the filter the backpressure is cyclically varied. As the level of particulates in the filter grows the backpressure increases. Subsequently, the particulates are burnt whereby the level of particulates is decreased and the backpressure is reduced.

The filters have a very different filtration capacity depending on the level of particulates stored in the filter. It would therefore be of interest to better control the level of particulates in the filter in such a way to improve the overall efficiency of the particulate filter.

SUMMARY

In view of above, it is an object of the present invention to provide improved control of the efficiency of filters for exhaust aftertreatment systems.

According to a first aspect of the invention, there is provided a method for controlling a filtering efficiency of a filter for an exhaust aftertreatment system, the filter including an inflow area, an outflow area, and a filtering area between the inflow area and the outflow area, the method including: determining a present exhaust mass flow into the filter, measuring a pressure drop across the filter from the inflow area and the outflow area of the filter, normalizing the measured pressure drop to provide a normalized pressure drop relative a predetermined normalization pressure level at a predetermined temperature for a model filter; comparing the normalized pressure drop to a pressure drop model including a relation between pressure drop and exhaust mass flow for a model filter; determining a pressure deviation between the normalized pressure drop and a pressure drop value calculated based on the pressure drop model and the present exhaust gas flow; and controlling the pressure drop across the filter for reducing the pressure deviation.

The present invention is based on the realization that the filter efficiency can be better controlled by firstly normalizing the measured pressure drop to a predetermined level. Subsequently the normalized pressure is compared to a pressure drop model for a model filter with known properties. The deviation found in the comparison is used as feedback for controlling the pressure drop. The normalization enables to control the efficiency of the filter by control of the pressure drop in way that reduces the impact of the temperature in the back pressure control. Further using the pressure drop model for the comparison with the normalized pressure provides for a common pressure drop model to adjust the pressure drop according to.

Controlling the pressure across the filter may for example be performed by increasing the temperature of the exhaust gas to thereby burn the particulates in the filter, as is commonly done in the art.

The number or density of particulates in the filter is related to some degree to the temperature of the filter, the pressure across the filter, and the flow of particulates in the exhaust gas. However, the pressure drop across the filter also depends on the temperature in the filter. Therefore, by normalizing the measured pressure drop to a predetermined level for a specific temperature, the influence of the temperature on the pressure drop evaluation is at least partly reduced.

The inventive concept provides for advantages including operating the filter at a narrower filter efficiency window which leads to improved fuel consumption, filter durability, and improved filtration efficiency.

The pressure drop model may provide a relation between the pressure drop across a model filter and the exhaust gas flow into the model filter. The model filter may be a clean filter, in other words, the pressure drop model may include a relation between pressure drop across a clean filter and exhaust mass flow to the clean filter. The normalized pressure drop may thus be compared to the pressure drop model for since the temperature dependence in the measured pressure has been at least partly eliminated by the normalization.

The determined exhaust gas flow may be received from a vehicle control unit performing such calculation. For example, the calculation may be based on the present air intake and fuel intake to the engine connected to the aftertreatment system, and the present operating speed of the engine (e.g. revolutions per minute). Thus, the present exhaust mass flow may be either retrieved (e.g. an exhaust mass flow value is retrieved) from a control unit or calculated by a control unit controlling the inventive method.

Controlling the pressure drop may include at least one of: fuel injection control to the aftertreatment system upstream of the filter, injection control to the combustion engine connected to the exhaust aftertreatment system, and air/fuel ratio control for the combustion engine. Accordingly, the pressure drop may be controlled by varying the temperature in the filter which thereby causes particulates to combust in the filter. Further, injection control to the combustion engine may include to adjust the fuel injection start time to the cylinder of the engine connected to the aftertreatment system.

Determining the pressure drop across the filter from the inflow area and the outflow area of the filter may include measuring the pressure before and after the filter, and measuring the temperature of the filter.

In some possible implementations, the predetermined normalization pressure level at the predetermined temperature may be determined from predetermined relation between pressure drop and temperature for a clean filter. Hereby, a well defined model is provided which is based on a clean filter with beneficial filter efficiency.

The inventive concept is applicable to various systems where particulates are filtered from exhaust gas. However, in embodiments, the filter is a particulate filter for filtering the exhaust gas from a combustion engine such as a petrol engine or diesel engine.

The predetermined temperature may advantageously be selected to be within a normal operation exhaust gas temperature range. Example temperatures are between 700° C. and 1000° C. such as 750° C., 800° C., 880° C., 920° C., 980° C., etc.

According to embodiments, the method steps are continuously repeated at a repetition rate. Thus, the method may provide for a feedback system operative to maintain the filter efficiency at or near a desirable level. Such repetition rate may for example be related to the revolution per minute of the combustion engine. Alternatively, the repetition rate may be substantially the same as the repetition rate for performing a lambda coefficient measurement of the exhaust gas. A lambda coefficient is a ratio between the present air fuel ratio and the stoichiometric air fuel ratio for a particular fuel. For measuring the lambda coefficient a measurement of the amount of residual oxygen or unburnt hydrocarbons is often perform in the exhaust gas. Measuring and analyzing a lambda coefficient is per se known to the skilled person.

According to a second aspect of the invention, there is provided a filter assembly for an exhaust aftertreatment system including: a filter including an inflow area for receiving an exhaust gas flow, an outflow area for emitting a filtered gas flow, and a filtering area between the inflow area and the outflow area configured to filter the exhaust gas flow to reduce the concentration of particulates in the exhaust gas flow, a pressure sensor assembly for measuring a pressure drop across the filter from the inflow area and the outflow area of the filter; a temperature sensor for measuring a temperature of the filtering area; and a control unit configured to: determine a present exhaust gas flow into the filter, normalize a measured pressure drop value relative a predetermined normalization pressure level for a model filter having a predetermined temperature; compare the normalized pressure drop value to a pressure drop model including a relation between pressure drop and exhaust gas flow for a model filter; determine a pressure deviation between the normalized pressure drop and a pressure drop value calculated based on the pressure drop model and the present exhaust gas flow; and cause a variation of the pressure drop across the filter for reducing the pressure deviation by causing an increase in the filter temperature.

According to embodiments, the pressure sensor assembly may include a pressure measuring unit arranged to measure the pressure at the inflow area and to measure the pressure at the outflow area, wherein a connecting line between the pressure measuring unit and the exhaust gas at the inflow, and a connecting line between the pressure measuring unit and the exhaust gas at the outflow area are of substantially the equal length.

The equal length provides for at least reduced phase difference between the measured pressure values. The connecting lines are fluid connection between the medium in the inflow or outflow area and the respective pressure measuring unit.

In some embodiments, the pressure drop model may include a linear relation between the pressure drop across a filter and exhaust gas flow to the filter. A linear model provides for a model which is relatively simple to use without the need for excessive computing power.

The control unit may be configured to control the timing of fuel injection to a combustion engine connected to the exhaust aftertreatment system for causing the variation in pressure drop by alternating the temperature of the exhaust gas from the engine.

Alternatively or additionally, the control unit may be configured to control an air/fuel ratio for the combustion engine for causing the variation in pressure drop.

This second aspect of the invention provides similar advantages as discussed above in relation to the previous aspect of the invention.

According to a third aspect of the invention, there is provided a vehicle including the exhaust aftertreatment system according to any one of the above embodiments, and a combustion engine configured to provide an exhaust gas flow to the exhaust aftertreatment system.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

Figure 1:
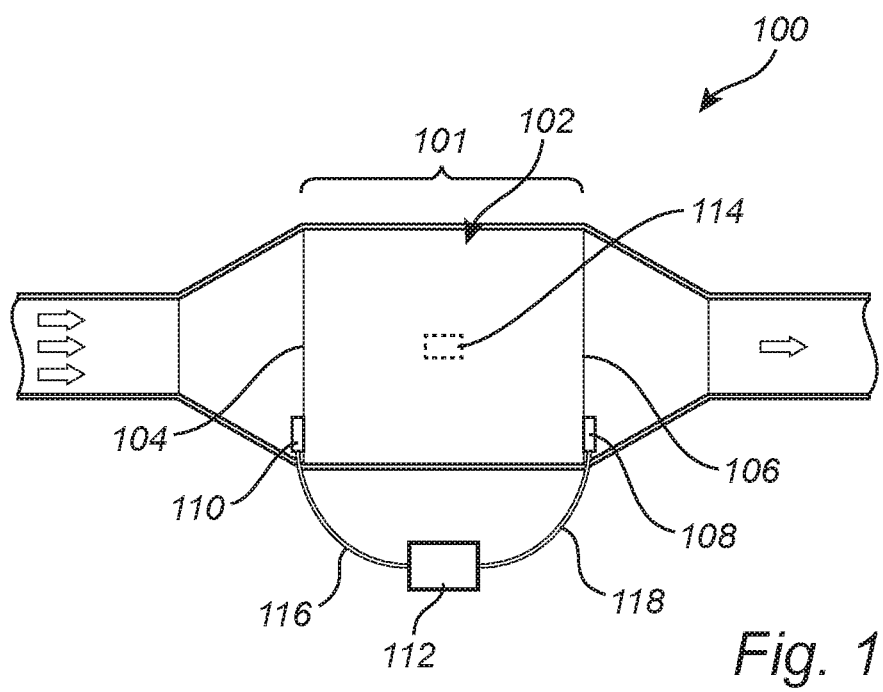
FIG. 1 conceptually illustrates exemplary filter assembly according to embodiments.

In the present detailed description, various embodiments of the assembly and method according to the present invention are described. However, this invention may generally be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 conceptually illustrates an exemplary filter assembly 100 for an exhaust aftertreatment system according to embodiments. The filter assembly 100 includes a filter 101 having an inflow area 104 for receiving an exhaust gas flow, and an outflow area 106 for emitting a filtered gas flow. The filter 101 further includes a filtering area 102 between the inflow area 104 and the outflow area 106 configured to filter the exhaust gas from particulates. Thus, the exhaust gas flow entering the filter 101 at the inflow area 104 is filtered in the filtering area 102 and the resulting filtered gas flow is emitted at the outflow area 106. The filtered gas flow includes a lower density of particulates compared to the exhaust gas entering the filtering area 102.

A pressure sensor assembly including a set of sensors 108, 110, and a measuring unit 112 is configured to measure the pressure drop across the filter 101. In some embodiments, the connection lines 116, 118 between the sensors 108, 110, and the measuring unit 112 are of substantially equal length in order to avoid phase differences between the sensed pressure upstream and downstream of the filter 101. In this embodiment only one measuring unit is shown, however, in some possible implementations one measuring unit for the inflow area and another measuring unit for the outflow area is included in the system 100.

The system further includes a temperature sensor 114 (conceptually shown), for measuring a temperature of the filter 101 in the filtering area 102. The temperature sensor may provide temperature data to a vehicle control unit (not shown in FIG. 1) and may be used as a reference for alternating the temperature in the filter.

Generally, filter efficiency depends on the amount of soot load in the filter. A large amount of soot (i.e. particles caught by the filter) in the filter results in higher efficiency in filtering (i.e. a low amount of particulates in the emitted filtered gas flow) but also to a high back pressure. An excessive back pressure leads to that no or very little gas flow will be able to pass through the filter 101 and therefore also to combustion engine malfunction. As the back pressure increases, a so-called regeneration is often performed in order to reduce the soot load in the filter and consequently reduce the back pressure across the filter 101.

Regeneration of the filter may be performed by adjusting the injection fuel start time in the engine cylinder associated with the filter 101. Other possibilities for varying the temperature in the filter for controlling the pressure drop is to adjust the air/fuel ratio provided to the combustion engine (not shown). Generally, it is desirable to increase the temperature in the filter for performing filter regeneration.

Figure 2A:
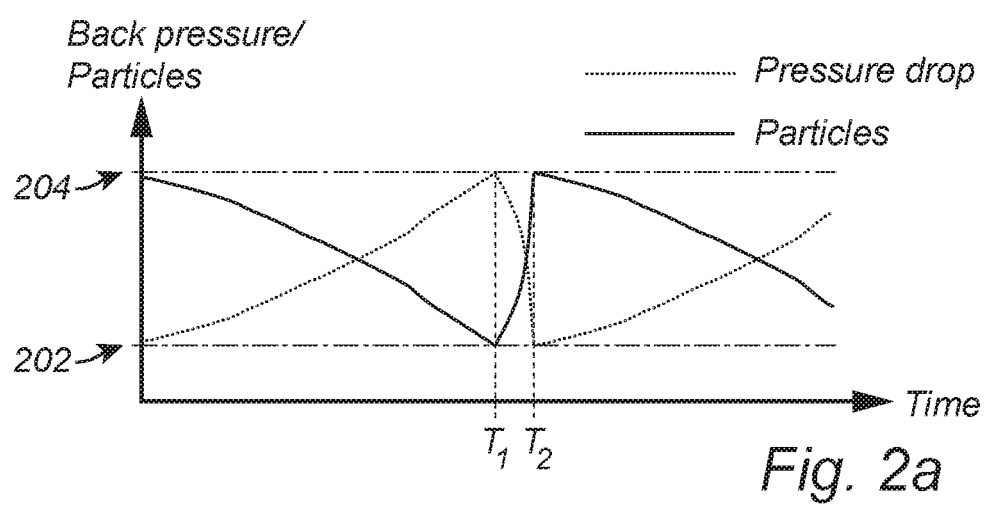
FIG. 2a schematically illustrates a regeneration cycle of a combustion engine particulate filter for a prior art vehicle aftertreatment system.

FIG. 2a illustrates a regeneration cycle of a combustion engine particulate filter for a prior art vehicle aftertreatment system. Initially, the filter is relatively clean and the pressure drop is low and the emitted flow of particulates from the filter is relatively high. Up until time $T_1$ in the graph, a build up in soot load in the filter occurs and the emitted flow of particulates from the filter is consequently reduced to reach a minimum at time $T_1$. During the same time period (up to time $T_1$ in FIG. 2a), the pressure drop across the filter (i.e. the backpressure) is increasing to reach a maximum at time $T_1$. At a regeneration process is performed which reduces the soot load in the filter and consequently increases the emitted flow of particulates from the filter. Further, the regeneration also causes a reduction of the back pressure in the filter and the cycle starts over at time $T_2$. The lines 202 and 204 indicate the boundaries for filter efficiency window. In prior art systems, the cycle shown in FIG. 2a is operated at a fixed cycle rate.

Figure 2B:
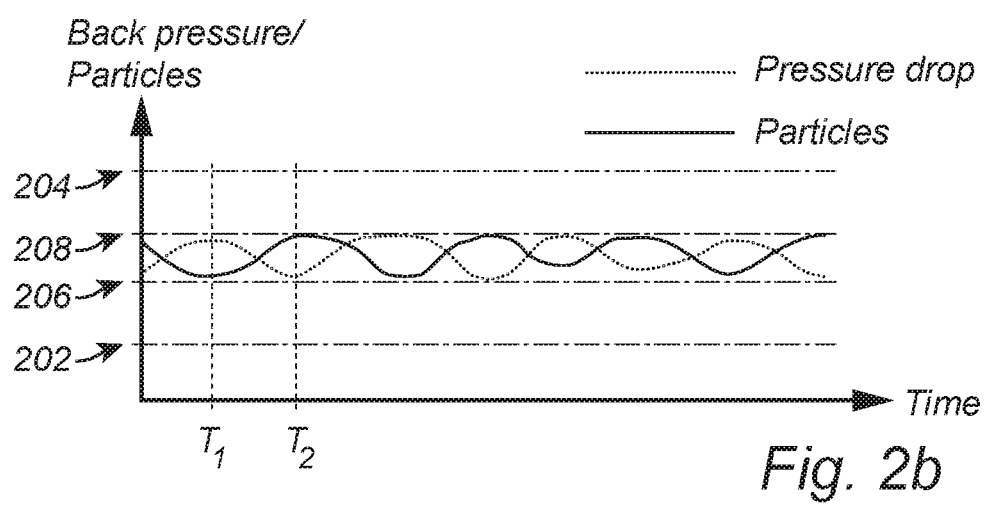
FIG. 2b schematically illustrates an improved regeneration cycle of a combustion engine particulate filter according to embodiments.

FIG. 2b illustrates a regeneration cycle as in FIG. 2a, but in FIG. 2b the cycle is performed in accordance with embodiments of the inventive concept. As is illustrated, the indicated boundaries 206 and 208 which show a filter efficiency window is substantially reduced compared to the prior art filter efficiency window illustrated by boundaries 202 and 204. This is due to the active filter control provided by the embodiments of the invention. Accordingly, as the pressure drop has increased to a maximum at T1 and the amount of particles in the emitted gas flow is at a minimum, the regeneration of the filter is performed sooner than in prior art systems. At time T2 is the pressure drop again at a minimum and the amount of particles in the emitted gas flow at a maximum. However, in order to be able to control the cycle as shown in FIG. 2b, the pressure drop must be measured and controlled in a well defined way that is consistent between measurements, as will be described next.

Figure 3:
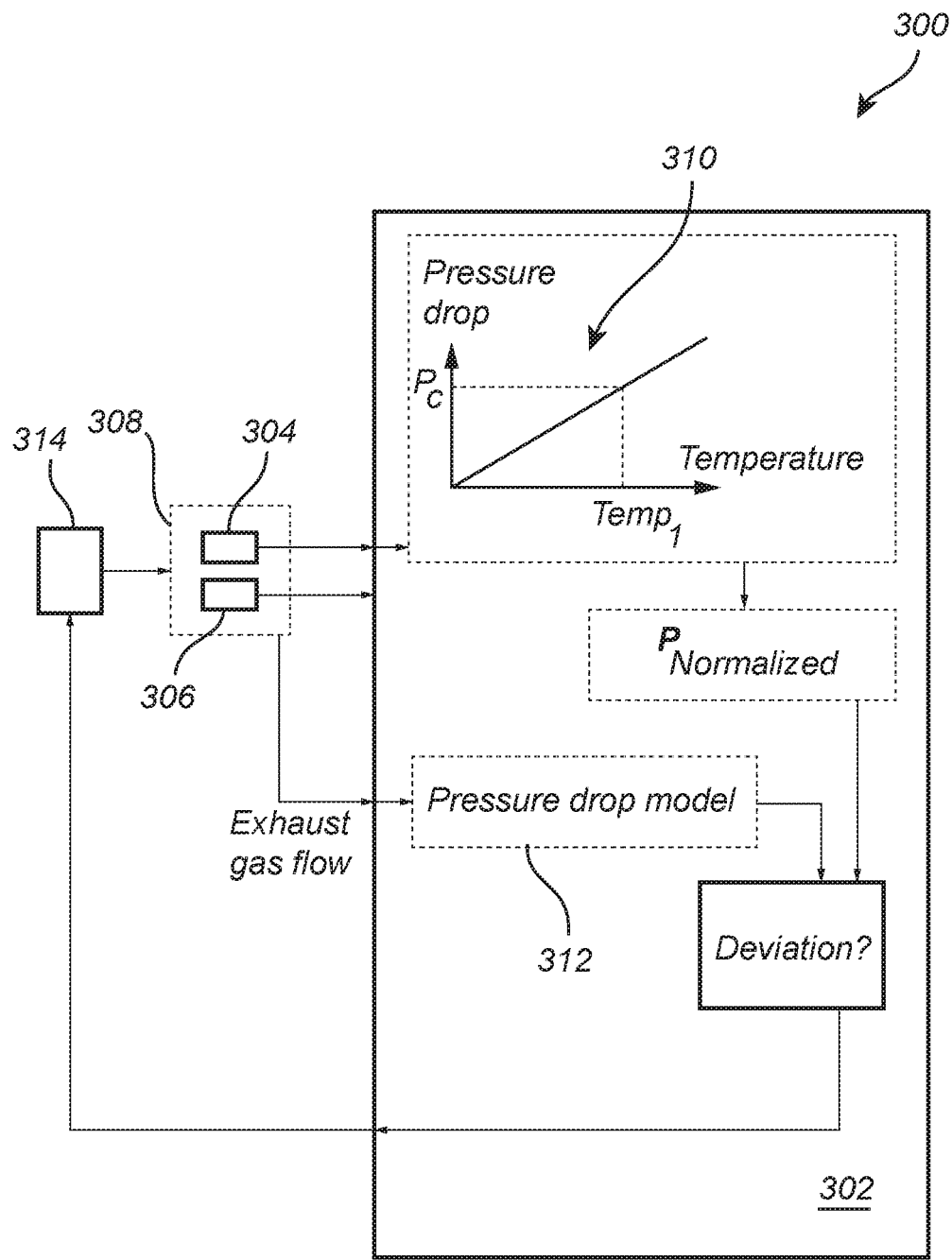
FIG. 3 conceptually illustrates exemplary filter assembly for an exhaust aftertreatment system according to embodiments.

FIG. 3 illustrates a box diagram of a filter assembly 300 for an exhaust aftertreatment system according to an example embodiment. The filter assembly 300 includes a control unit 302 arranged to receive pressure data from a pressure sensor assembly 304 and temperature data from a temperature sensor 306. The pressure data is indicative of the pressure drop across a filter 308, and the temperature data is indicative of the temperature of the filter 308, the filter is only schematically illustrated as a dashed box 308.

The control unit 302 determines the pressure drop across the filter 308 and normalizes the determined pressure drop relative a pressure $P_C$ at a predetermined temperature $Temp_1$ determined for a model filter. The normalized pressure is given by $P_{Normalized}=P_{Measured}/P_C$. The model filter is preferably representative of a clean filter with a relatively linear pressure drop versus temperature curve 310. The normalized pressure $P_{Normalized}$ is subsequently compared to a pressure drop model 312 which includes a relation between pressure drop (P) across the filter and exhaust gas flow ($\dot{m}_{exhaust}$) to the filter 308. The pressure drop model may be given on the general form:

$$P=A+K_1\dot{m}_{exhaust}+K_2\dot{m}_{exhaust}^2+\ldots K_n\dot{m}_{exhaust}^n$$

where A and $K_1-K_n$ are constants. This pressure drop model is based on the pressure drop across a clean model filter. The normalized pressure drop may be compared to the above pressure drop model since the temperature dependence in the measured pressure has been eliminated by the normalization.

Although any order of the above pressure drop model 312 may be used, in some embodiments the simplified form:

$$P=A+K_1\dot{m}_{exhaust}$$

is used as a pressure drop model 312.

Inserting the measured exhaust gas flow in to the model 312 provides a calculated pressure drop value. A comparison between the calculated pressure drop and the normalized pressure drop may result in a deviation between the between the normalized pressure drop ($P_{Normalized}$) and a pressure drop value calculated based on the pressure drop model 312.

The control unit 302 subsequently controls a fuel injection unit 314 to inject fuel into the exhaust gas flow upstream the filter 308, or to vary the air/fuel ratio in the combustion engine in other to increase the temperature in the filter to combust soot in the filter and thereby decrease the pressure drop across the filter 308. For example, injection control to the combustion engine may include to adjust the fuel injection start time to the cylinder of the engine connected to the aftertreatment system. Next, the process described with reference to FIG. 3 is initiated again in order to provide for active control of the pressure drop across the filter 308 and thereby also the filter efficiency. Thus, the steps are repeated at a repetition rate for maintaining the filter efficiency at or near a desirable level. Such repetition rate may for example be related to the revolution per minute of the combustion engine or the repetition rate for performing a lambda coefficient measurement of the exhaust gas in the aftertreatment system.

The temperature data may be used for controlling the pressure across the filter which often performed by increasing the temperature of the exhaust gas to thereby burn the particulates in the filter. Thus, cause a variation of the pressure drop across the filter for reducing the pressure deviation includes to increase the temperature of the filter, the temperature being monitored by the temperature sensor 306.

Figure 4:
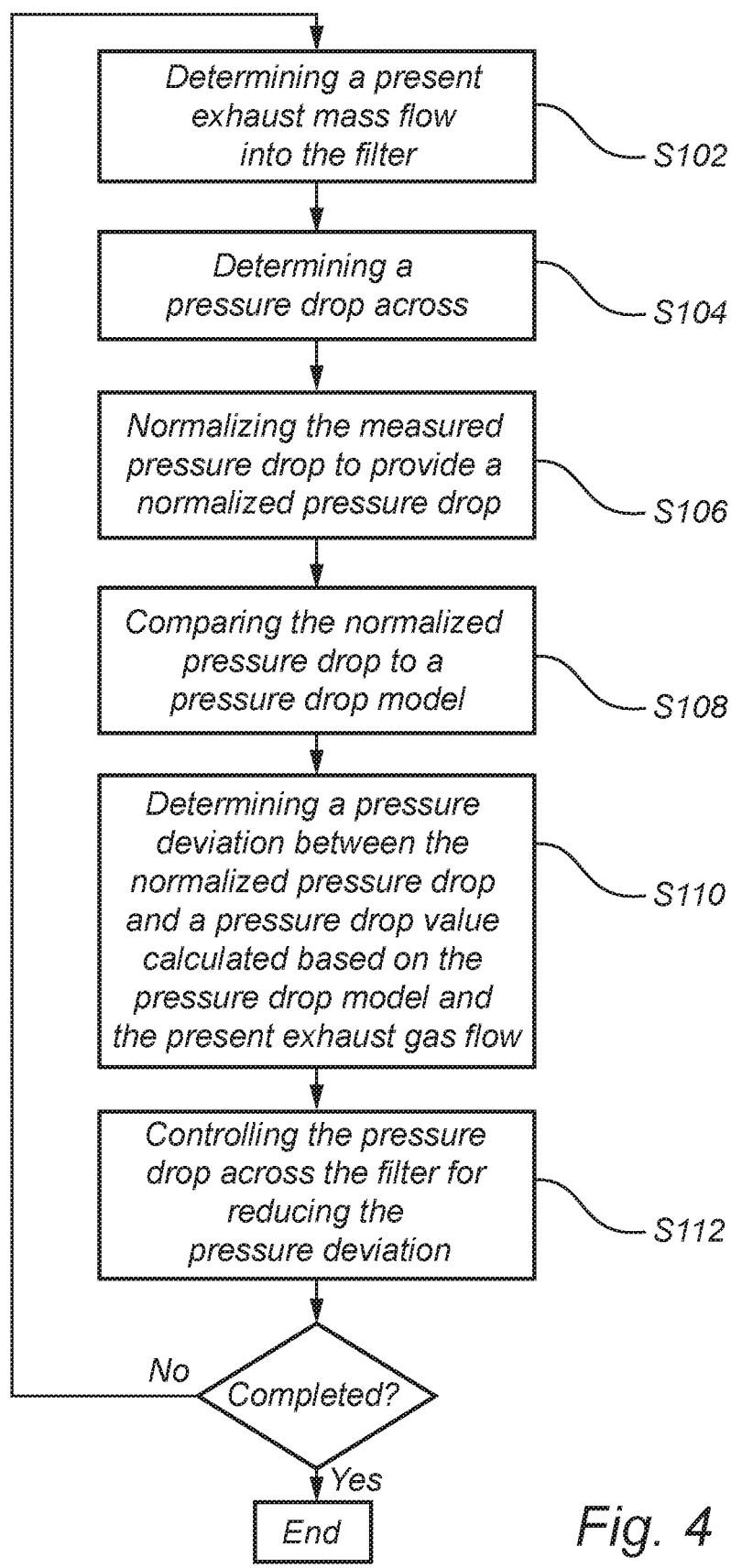
FIG. 4 is a flow chart of method steps according to embodiments of the invention.

FIG. 4 illustrates a flow-chart of method steps according to example embodiments. In step S102 a present exhaust mass flow into the filter is determined. In a further step S104 is a pressure drop across the filter determined. The pressure drop is a pressure drop across the filter from an inflow area to an outflow area of the filter. Subsequently S106, the measured pressure drop is normalized to provide a normalized pressure drop relative a predetermined normalization pressure level at a predetermined temperature for a model filter. In step S108 is the normalized pressure drop compared to a pressure drop model including a relation between the pressure drop across a filter and exhaust mass flow to the filter. Further, a pressure deviation is determined in step S110 between the normalized pressure drop and a pressure drop value calculated based on the pressure drop model and the present exhaust gas flow. Finally, in step S112, the pressure drop across the filter is controlled for reducing the pressure deviation. Preferably the pressure drop across the filter is controlled to minimize the deviation.

Unless the process of controlling the filter efficiency is completed from some reason, e.g. vehicle shut off, or aftertreatment shut off, the method starts over again at step S102. The method is preferably performed continuously, or at a repetition rate related to e.g. the repetition rate for performing a lambda coefficient measurement of the exhaust gas in the aftertreatment system.

The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for controlling a filtering efficiency of a filter for an exhaust aftertreatment system, the filter comprising an inflow area, an outflow area, and a filtering area between the inflow area and the outflow area, the method comprising:
   determining a present exhaust mass flow into the filter;
   determining a pressure drop across the filter between the inflow area and the outflow area of the filter;
   normalizing the determined pressure drop to provide a normalized pressure drop relative a predetermined normalization pressure level at a predetermined temperature for a model filter;
   comparing the normalized pressure drop to a pressure drop model comprising a relation between pressure drop and exhaust mass flow for a model filter;
   determining a pressure deviation between the normalized pressure drop and a pressure drop value calculated based on the pressure drop model and the present exhaust gas flow; and
   controlling the pressure drop across the filter for reducing the pressure deviations;
   wherein the method steps are continuously repeated at a repetition rate, wherein the repetition rate is substantially the same as a repetition rate for performing a lambda coefficient measurement of an exhaust gas.

2. The method according to claim 1, wherein controlling the pressure drop comprises at least one of: fuel injection control to a combustion engine connected to the exhaust aftertreatment system, and air/fuel ratio control for the combustion engine.

3. The method according to claim 1, wherein the predetermined normalization pressure level at the predetermined temperature is determined from a predetermined relation between pressure drop and temperature for a clean filter.

4. The method according to claim 1, wherein the filter is a particulate filter for filtering an exhaust gas from a combustion engine.

5. The method according to claim 1, wherein the predetermined temperature is selected to be within a normal operation exhaust gas temperature range.

6. A filter assembly for an exhaust aftertreatment system comprising:
- a filter comprising an inflow area for receiving an exhaust gas flow, an outflow area for emitting a filtered gas flow, and a filtering area between the inflow area and the outflow area configured to filter the exhaust gas flow to reduce a concentration of particulates in the exhaust gas flow;
- a pressure sensor assembly for measuring a pressure drop across the filter from the inflow area and the outflow area of the filter;
- a temperature sensor for measuring a temperature of the filtering area; and
- a control unit configured to:
- determine a present exhaust gas flow into the filter;
- normalize a determined pressure drop value relative a predetermined normalization pressure level for a model filter having a predetermined temperature;
- compare the normalized pressure drop value to a pressure drop model comprising a relation between the pressure drop and exhaust gas flow;
- determine a pressure deviation between the normalized pressure drop and a pressure drop value calculated based on the pressure drop model and the present exhaust gas flow; and
- cause a variation of the pressure drop across the filter for reducing the pressure deviation by causing an increase in the filter temperature;
- wherein the control unit steps are continuously repeated at a repetition rate, wherein the repetition rate is substantially the same as a repetition rate for performing a lambda coefficient measurement of an exhaust gas.

7. The filter assembly according to claim 6, wherein the pressure sensor assembly comprises a pressure measuring unit arranged to measure a pressure at the inflow area and to measure a pressure at the outflow area, wherein a connecting line between the pressure measuring unit and the exhaust gas flow at the inflow area and a connecting line between the pressure measuring unit and the exhaust gas flow at the outflow area are of a substantially equal length.

8. The filter assembly according to claim 6, wherein the pressure drop model comprises a linear relation between the pressure drop across a filter and exhaust gas flow to the filter.

9. The filter assembly according to claim 6, wherein the control unit is configured to control fuel injection to a combustion engine connected to the exhaust aftertreatment system for causing the variation in pressure drop.

10. The filter assembly according to claim 9, wherein the control unit is configured to control an air/fuel ratio for the combustion engine.

11. A vehicle comprising an exhaust aftertreatment system comprising a filter assembly, the filter assembly comprising:
- a filter comprising an inflow area for receiving an exhaust gas flow, an outflow area for emitting a filtered gas flow, and a filtering area between the inflow area and the outflow area configured to filter the exhaust gas flow to reduce the concentration of particulates in the exhaust gas flow;
- a pressure sensor assembly for measuring a pressure drop across the filter from the inflow area and the outflow area of the filter;
- a temperature sensor for measuring a temperature of the filtering area; and
- a control unit configured to:
- determine a present exhaust gas flow into the filter;
- normalize a determined pressure drop value relative a predetermined normalization pressure level for a model filter having a predetermined temperature;
- compare the normalized pressure drop value to a pressure drop model comprising a relation between the pressure drop and exhaust gas flow;
- determine a pressure deviation between the normalized pressure drop and a pressure drop value calculated based on the pressure drop model and the present exhaust gas flow; and
- cause a variation of the pressure drop across the filter for reducing the pressure deviation by causing an increase in the filter temperature;
- wherein the control unit steps are continuously repeated at a repetition rate, wherein the repetition rate is substantially the same as a repetition rate for performing a lambda coefficient measurement of an exhaust gas.

12. The vehicle according to claim 11, wherein the pressure sensor assembly comprises a pressure measuring unit arranged to measure the pressure at the inflow area and to measure the pressure at the outflow area, wherein a connecting line between the pressure measuring unit and the exhaust gas at the inflow area and a connecting line between the pressure measuring unit and the exhaust gas at the outflow area are of substantially the equal length.

13. The vehicle according to claim 11, wherein the pressure drop model comprises a linear relation between the pressure drop across a filter and exhaust gas flow to the filter.

14. The vehicle according to claim 11, wherein the control unit is configured to control fuel injection to a combustion engine connected to the exhaust aftertreatment system for causing the variation in pressure drop.

15. The vehicle according to claim 14, wherein the control unit is configured to control an air/fuel ratio for the combustion engine.

* * * * *